United States Patent [19]

Brandenburg

[11] 4,078,776
[45] Mar. 14, 1978

[54] SUPPORT CONSTRUCTION FOR A HORIZONTAL CONDUIT, WHICH IS CONNECTED TO A VESSEL

[75] Inventor: Jan Hendrik Brandenburg, Heemstede, Netherlands

[73] Assignee: Hoogovens Ijmuiden, B.V., Ijmuiden, Netherlands

[21] Appl. No.: 725,415

[22] Filed: Sep. 21, 1976

[30] Foreign Application Priority Data

Sep. 29, 1975 Netherlands .................... 7511424

[51] Int. Cl.² .............................................. C21B 7/00
[52] U.S. Cl. ......................................... 266/139; 248/60
[58] Field of Search .............. 266/138, 139, 186–189, 266/197, 198; 432/40, 214, 216–218, 221; 285/61; 248/58, 60, 62

[56] References Cited

U.S. PATENT DOCUMENTS

| 248,462 | 10/1881 | Hartman | 266/189 |
|---|---|---|---|
| 303,207 | 8/1884 | Bennett | 266/139 |
| 349,841 | 9/1886 | Gordon | 285/61 |
| 1,074,097 | 9/1913 | Stevens | 266/139 |
| 1,498,968 | 6/1924 | Hill | 285/61 |
| 1,703,518 | 2/1929 | Dovel | 266/197 |
| 2,731,234 | 1/1956 | Bily | 285/61 |
| 3,824,070 | 7/1974 | Drebes | 432/214 |

FOREIGN PATENT DOCUMENTS

151,362  9/1961  U.S.S.R. .............................. 266/186

*Primary Examiner*—Gerald A. Dost
*Attorney, Agent, or Firm*—Stevens, Davis, Miller & Mosher

[57] ABSTRACT

A conduit, specifically a hot-blast main for a blast furnace, is supported on a vessel specifically a hot-blast stove, into which it is connected by a branch, by means of at least one vertical support member and a framework mounted on the vessel and carrying the support member. The framework includes a strut or tie element extending from the end of the support member to the point of connection of the conduit branch into the furnace. The support member, which may be a rod hinged to the framework, may suspend the conduit from above or support it from below. This construction is simple and provides support for the conduit without problems due to vertical movement caused by thermal expansion of the point of connection into the vessel.

13 Claims, 3 Drawing Figures

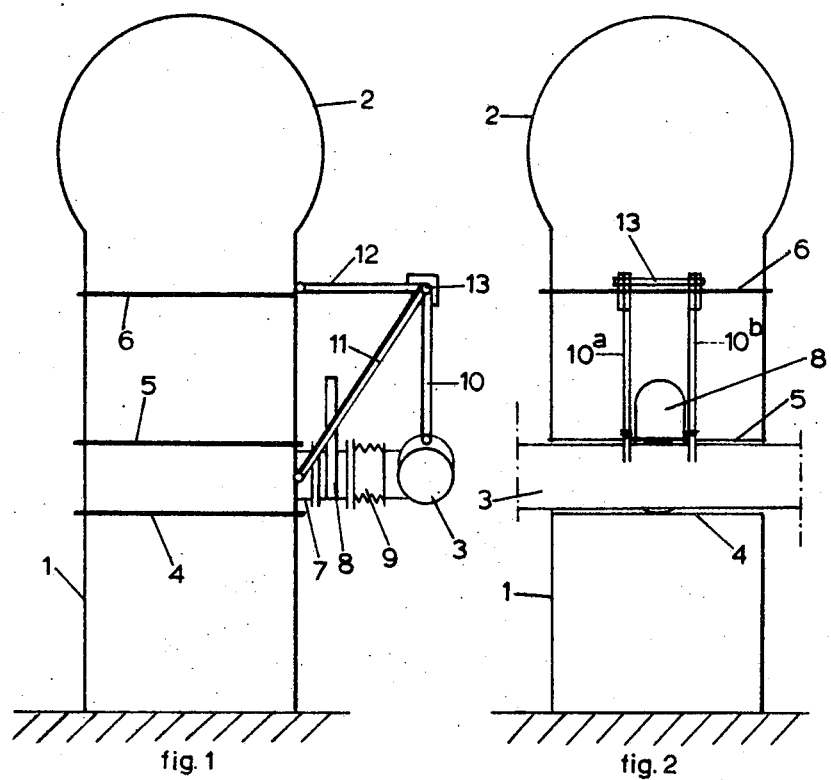
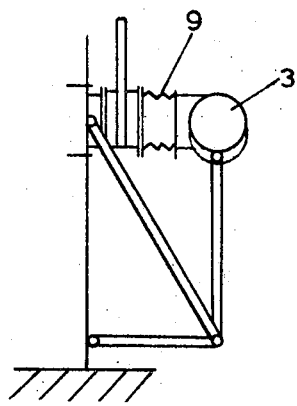

SUPPORT CONSTRUCTION FOR A HORIZONTAL CONDUIT, WHICH IS CONNECTED TO A VESSEL

The invention relates to a support arrangement for a conduit at its connection into a larger vessel, more particularly where the connection point into the vessel is subject to vertical displacement with respect to the foundation of the vessel. An example of such a configuration of a conduit and a vessel is the configuration of a hot-blast conduit and a hot-blast stove for a blast furnace operation. The hot-blast stove supplies pre-heated combustion air, which is supplied via a hot-blast outlet and a short branch conduit into the hot-blast main conduit, which transports the pre-heated air to the blast furnace. Between the hot-blast outlet of the hot-blast stove and the hot-blast conduit as a rule a valve and an expansion bellows are also provided.

It is usual to support the hot-blast conduit by supports which are connected to the ground. A difficulty which is then experienced is that the hot-blast stove is periodically heated and blown cold again, which has the result that the hot-blast outlet may move vertically. This effect can be reinforced by changes in gas pressure inside the hot-blast stove. A consequence of this is that the vertical displacement of the hot-blast outlet relative to the hot-blast conduit must be accommodated by the bellows construction which as a rule is not designed for this purpose, or, if it is, has an undesirable length.

It has been proposed to suspend the hot-blast conduit, near the hot-blast stove, from the hot-blast stove by means of a bracket, for which purpose the hot-blast stove near the hot-blast outlet should be provided with heavy reinforcing rings. Near this region the hot-blast conduit should then not be supported on the ground. This proposed design has considerable disadvantages, as it leads to very great forces and stresses in the structure of the support.

In the foregoing problems of the support of a horizontal conduit which is connected to a vessel have been explained particularly in relation to the connection of a hot-blast conduit to a hot-blast stove. Similar problems may, however, occur in all kinds of constructions, in which the vessel is not a hot-blast stove and the conduit is not a hot-blast conduit. The invention is not limited to the case of a hot-blast stove and a hot-blast conduit.

According to the invention, there is provided a support arrangement for a conduit at its connection into a larger vessel, the point of connection being subject to vertical displacement with respect to the vessel's foundation, wherein the conduit is supported, at a region spaced from the said point of connection, by at least one support member connected at a first end to the conduit and supported at its other end by a framework in a manner permitting lateral movement of the conduit relative to the framework, the framework being mounted on the vessel and including at least one load-bearing element extending from the region of said other end of the support member to the vessel at the region of said point of connection.

The conduit is in this way given freedom of movement in space, while the framework and support member ensure that the point of supported region of the conduit may move vertically with each movement of the connection point of the conduit to the vessel. A very simple construction is that in which the framework comprises, apart from the said load-bearing element, just a substantially horizontal element extending from the region of the said other end of the support element to the vessel.

The invention is especially applicable where the conduit is horizontal (at least adjacent the vessel) and where it has a main section and a branch extending from the main section to the said point of connection into the vessel, the conduit being connected to said support member at the junction of the main section and the branch.

Preferably, the support member is a substantially vertical rod or bar hingedly connected to the framework.

Upon consideration of the forces acting in the various elements of the framework and the support member it will be clear that the construction may only be additionally loaded to a small degree, and that it may also be of little importance whether the conduit is supported from above or below. Both arrangements therefore are possible in the application of the invention, as is also an arrangement in which the conduit is supported from both above and below by a support member and framework. Whichever solution is to be preferred in an actual case can therefore depend on local circumstances, such as room available.

A stable construction may be obtained if the framework and the support member taken together are three-dimensional in form, having elements on both sides of a vertical plane passing through said point of connection of the conduit to the vessel and through the said region of at which the support member is connected to the conduit. Thus at least some of the elements of the framework and the support member may be provided in duplicate, i.e. they are located in different positions transversely with respect to the framework. In this way it then is possible for instance to have two of said load-bearing elements extend at different sides of the connection point into the vessel, or in the case of a hot-blast stove, at different sides of the hot-blast outlet, thus obtaining a more symmetrical distribution of the weight of the conduit over the wall of the vessel.

The more vertically the said load-bearing element extends, the smaller is the force which it must transmit onto the vessel structure, and the more this force will approach the actual weight of the hanging conduit section. At the same time a larger framework is required however, which may cause design disadvantages. Good results may be obtained if the load-bearing element extends at an angle of less than 45° and preferably less than 30°, to the vertical.

Two embodiments of the invention will now be described by way of example with reference to the accompanying drawing, in which:

FIG. 1 shows the relative positioning of a hot-blast stove and a conduit in one embodiment diagrammatically;

FIG. 2 shows the same arrangement seen from the right-hand side of FIG. 1; and

FIG. 3 shows a modified embodiment.

Referring to FIG. 1, the hot blast stove has a shell 1 which is covered by a cupola construction 2. The hot-blast main 3 extends horizontally past the stove. The shell 1 is strengthened by three rings 4, 5 and 6, the rings 4 and 5 being positioned at the height of the hot-blast outlet 7. In the branch of the main 3 extending between hot-blast outlet 7 and the hot-blast main 3 itself, a hot-blast valve 8 and a bellows compensator 9 are provided.

In the region of the stove, the hot-blast main 3 is suspended by two bars 10$^a$ and 10$^b$ (see FIG. 2) which are pivotted on a hinge shaft 13 which itself is connected to two diagonal struts 11 (only one of which is shown in FIG. 1) and to two tie bars 12 (again only one is shown in FIG. 1), thus forming a three-dimensional framework. The struts 11 extend from the upper ends of the bars 10$^a$, 10$^b$ to the stove adjacent the hot-blast outlet 7. The two struts 11 and two tie bars 12 are respectively on either side of the outlet 7, and are connected to the shell 1 or to the rings 4, 5, 6.

It will be clear that a vertical displacement of the hot-blast outlet 7 is accompanied by a substantially identical vertical displacement of the hinge-point 13, and hence by a vertical displacement of the conduit 3 which also is substantially identical. The conduit 3 can nevertheless move laterally towards and away from the outlet 7.

FIG. 3 shows an alternative embodiment in which the conduit 3 is instead supported from below, by a structure similar to that of FIGS. 1 and 2 but reversed through the horizontal plane of the axis of the conduit 3. In this case the diagonal load-bearing element becomes a tie-bar.

Although it is clear that best results theoretically may be obtained by selecting the connection point into the vessel at the same height as the symmetry axis of the horizontal main conduit, small vertical deviations, for reasons of design advantage, have been found to be admissible.

What I claim is:

1. Support arrangement for a conduit connectable to a larger vessel, at a point of connection subject to vertical displacement with respect to the vessel's foundation, comprising a framework and at least one support member connectable at a first end to the conduit at a region spaced from the said point of connection, and pivotally supported from a horizontal axis at its other end by said framework in a manner permitting lateral movement of the conduit relative to the framework, the framework being mountable on the vessel and including at least one load-bearing element extendable from the region of said other end of the support member to the vessel at the region of said point of connection.

2. Support arrangement according to claim 1 wherein the support member is a rod or bar hingedly connected to the framework and positioned substantially vertically.

3. Support arrangement according to claim 1 wherein the framework includes a substantially horizontal element extending from the region of the said other end of the support means to the vessel.

4. Support arrangement according to claim 1 wherein the support member suspends the conduit from the framework.

5. Support arrangement according to claim 1 wherein the support member supports the conduit from below.

6. Support arrangement according to claim 1 wherein the conduit is both suspended from above and supported from below in each case by a support member and a framework.

7. Support arrangement according to claim 1 wherein the framework and the support member taken together are three-dimensional in form, having elements on both sides of a vertical plane passing through said point of connection of the conduit to the vessel and through the region at which the support member is connected to the conduit.

8. Support arrangement according to claim 1 wherein the load-bearing element in the framework extends at an angle of less than 45° to the vertical.

9. Support arrangement according to claim 8 wherein the load-bearing element in the framework extends at an angle of less than 30° to the vertical.

10. An arrangement whereby a conduit is connected to a larger vessel which at the point of connection is subject to vertical displacement comprising a vertically displaceable vessel, a conduit connected to said vessel, at least one support member and a framework mounted on the vessel having at least one load-bearing element, said support member being connected at a first end to the conduit at a region spaced from the point of connection and pivotally supported from a horizontal axis at its other end by said framework in a manner permitting lateral movement of the conduit relative to the framework, said load-bearing element extending from the region of said other end of the support member to the vessel at the region of the point of connection.

11. Support arrangement according to claim 10 wherein the conduit has a main section and a branch extending from the main section to the said point of connection into the vessel, the conduit being connected to said support member at the junction of the main section and the branch.

12. The arrangement according to claim 10, wherein the vessel is a hot-blast stove for a blast furnace and the conduit is a hot-blast main.

13. The arrangement according to claim 12 wherein the hot-blast main is connected to the hot-blast outlet of the stove by a branch which includes an expansion bellows.

* * * * *